United States Patent Office 3,513,166
Patented May 19, 1970

3,513,166
3-(OMEGA-AMINOALKYL)-4-SUBSTITUTED-1,
3-BENZOXAZINE-2-ONES
John A. Richman, Jr., Richmond, Va., assignor to A. H.
Robins Company, Incorporated, Richmond, Va., a corporation of Virginia
No Drawing. Filed May 22, 1967, Ser. No. 640,382
Int. Cl. C07d 87/08, 87/38, 29/38
U.S. Cl. 260—247.2                              6 Claims

ABSTRACT OF THE DISCLOSURE

The invention relates to 3-(omega-aminoalkyl)-4-substituted-1,3-benzoxazine-2-ones. The phenyl moiety of the benzoaxine ring may be further substituted by lower alkyl-lower alkoxy- and trifluoromethyl groups and by chlorine and bromine. The compounds are tranquilizers. 2-hydroxybenzaldehydes, 2-hydroxyacylphenones and 2-hydroxybenzophenones are condensed with omega-alkylamines, the resulting Schiff bases are reduced catalytically or by sodium borohydride and the N-omega-aminoalkyl-2-hydroxy-α-substituted benzylamines cyclized using a carbonyl halide in the presence of a base to the 3-(omega-aminoalkyl) - 4 - substituted-1,3-benzoxazine-2-ones of the present invention.

The present invention relates to certain heterocyclic organic compounds referred to generally as benzoxazine-2-ones, particularly 3-(omega-aminoalkyl)-4-substituted-1, 3-benzoxazine-2-ones, acid addition salts thereof, processes for the production thereof, therapeutic compositions containing the same as active ingredients, and methods of making and using them.

The invention is especially concerned with compounds of the formula:

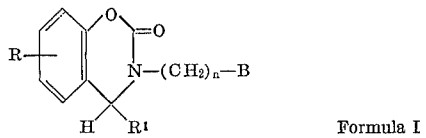

Formula I wherein:

R is selected from the group consisting of hydrogen, halogen having an atomic weight less than 80, lower alkyl, lower alkoxy, and trifluoromethyl,
$R^1$ is selected from the group consisting of hydrogen, lower alkyl, phenyl and substituted phenyl,
B is a disubstituted basic nitrogen,
$n$ is an integer from 2 to 4 inclusive, and acid addition salts thereof.

The compounds of the invention corresponding to Formula I are primarily useful as major tranquilizers. Compounds which block agressive behavior in fighting mice may be classified as major tranquilizers [Da Vanzo, J. P., et al., Psychopharmacologia 9, 210 (1959)]. The compounds of the present invention possess this property to a high degree and are therefore classified as such.

In particular, the compound of Example 23, 3-[3-(4-phenylpiperazino)-propyl]-1,3 - benzoxazine-2-one hydrochloride represents the preferred tranquilizing compound of this invention and the steps preparing the same represent a specific example of the preferred process from among these various processes described. 3-[-(4-phenylpiperazino)-propyl]-1,3-benzoxazine-2-one hydrochloride was found to have an $ED_{50}$ of 7.1 mg./kg. The $ED_{50}$ was determined by the injection of appropriate number of doses and subjecting the results to probit analysis according to the method of J. Litchfield and F. Wilcoxon, J. Pharm. and Exptl. Therap. 96, 99 (1949).

The primary object of this invention is to provide novel and useful compounds, compositions containing and methods of producing, the same, and methods of treating animals therewith. Additional objects will become apparent hereinafter and still others will be apparent to one skilled in the art from the following description and appended claims.

In the definition of the symbols in the foregoing Formula I and where they appear elsewhere hereinafter in the specification and claims, the terms have the following significance.

The term "lower-alkyl" as used herein includes straight and branched chain radicals of up to eight carbon atoms inclusive and is exemplified by such groups as methyl, ethyl, propyl, isopropyl, butyl, tertiary butyl, amyl, hexyl, isoamyl, heptyl, octyl, and the like.

The term "lower-alkoxy" has the formula —O-lower-alkyl.

A "substituted phenyl" radical is a phenyl radical substituted by any radical or radicals which are not reactive or otherwise interfering under the conditions of reaction in the processes for making the compounds, such radicals including lower-alkyl, lower-alkoxy, trifluoromethyl, nitro, halo and the like. The substituted phenyl radicals have preferably no more than one to three substituents such as those given above and furthermore, these substituents can be in various available positions of the phenyl nucleus and when more than one substituent is present, can be the same or different and can be in various position combinations relative to each other. The lower-alkyl and lower-alkoxy substituents each have preferably from one to four carbon atoms which can be arranged as straight or branched chains. A total of nine carbon atoms in all ring substituents, making a total of fifteen carbon atoms in the radical is the preferred maximum.

Among the suitable amino radicals included within the symbol B are radicals, such as di-(lower-alkyl)-amino, N - (lower-alkyl)-phenylamino, N - (lower-alkyl)-substituted - phenyl - amino, diphenylamino, di-substituted-phenylamino, N - phenyl-substituted-phenylamino, morpholino, pyrrolidino, piperidino, piperazino, 4-(lower-alkyl) - piperazino, 4-phenylpiperazino, 4-phenyl-4-hydroxypiperidino, 4-substituted-phenyl - 4 - hydroxy-piperidino, 4-substituted phenyl-4-alkanoyloxypiperidino, 4-phenyl-1,2,5,6 - tetrahydropyridino, 4-substituted-phenyl-1,2,5,6-tetrahydropyridino and 2-pyridyl.

This invention also includes acid-addition salts of the bases of Formula I formed with nontoxic organic and inorganic acids. Such salts are easily prepared by methods known in the art. When the compounds are to be used as intermediates for preparing other compounds or for any nonpharmaceutical use, the toxicity or nontoxicity of the salt is immaterial; when the compounds are to be used as pharmaceuticals, they are most conveniently used in the form of nontoxic acid-addition salts. Both toxic and nontoxic salts are therefore within the purview of the invention. The acids which can be used to prepare the preferred non-toxic acid-addition salts are those which produce, when combined with the free bases, salts whose anions are relatively innocuous to the animal organism in therapeutic doses of the salts, so that beneficial physiological properties inherent in the free bases are not vitiated by side effects ascribable to the anions.

The base is reacted with the calculated amount of organic or inorganic acid in aqueous miscible solvent, such as ethanol or isopropanol, with isolation of the salt by concentration and cooling, or the base is reacted with an excess of the acid in aqueous immiscible solvent, such as ethyl ether or isopropyl ether, with the desired salt separating directly. Exemplary of such organic salts are those formed with maleic, fumaric, benzoic, ascorbic, pamoic, succinic, methanesulfonic, tartaric, malic, citraconic, itaconic acid and the like. Exemplary of such inorganic salts are those formed with hydrochloric, hydrobromic, sulfuric, sulfamic, phosphoric and nitric acids.

The compounds of the present invention are prepared by the following series of steps:

(1) A 2-hydroxybenzaldehyde of the formula

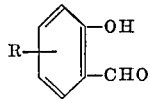

Formula II or a 2-hydroxyacylphenone or a 2-hydroxybenzophenone of the formula

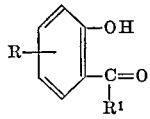

Formula III wherein R and $R^1$ are as represented above, is reacted with an equimolar quantity of an omega-aminoalkylamine of the formula.

$$H_2N-(CH_2)_n-B \qquad \text{Formula IV}$$

wherein B and $n$ are as represented above, in a dry organic solvent as, for example, toluene, containing a catalytic amount of p-toluene sulfonic acid. The water formed during the reaction is continuously removed using a Dean-Stark trap or by azeotropic distillation of the toluene-water azeotrope after completion of the reaction to yield the corresponding Schiff base of the formula

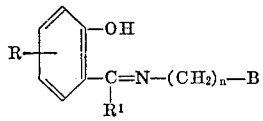

Formula V wherein R, $R^1$, B and $n$ are as represented above.

(2) The Schiff base of Formula V is catalytically reduced, preferably in an alcohol medium at three atmospheres of hydrogen using a nickel catalyst or it is reduced in an alcohol medium using sodium borohydride to yield the reduced compound of the formula

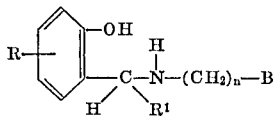

Formula VI wherein R, $R^1$, B and $n$ are as represented above.

(3) The N - (omega - aminoalkyl)-2-hydroxybenzylamine of the Formula VI is dissolved in chloroform, the solution cooled to 0° C. and treated with a chloroform solution containing an equimolar quantity of a carbonylhalide, preferably phosgene. After stirring and allowing the temperature to rise to 10° C., a base which may be sodium hydroxide, sodium carbonate, triethylamine or a sodium alkoxide is added to bind the acid formed in the reaction. The product, a 3 - (omega - aminoalkyl) - 1,3-benzoxazine-2-one, of the formula

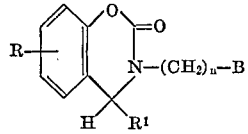

Formula I wherein R, $R^1$, B and $n$ are as represented above is isolated by concentration of the reaction mixture with crystallization of the product from the concentrated solution or by extraction of the product from the reaction mixture by a suitable solvent.

The novel compounds of the present invention can also be prepared by an alternate series of steps:

(1) A 2-hydroxybenzaldehyde of the Formula II or a 2-hydroxyacylphenone or a 2-hydroxybenzophenone of Formula III is reacted with an omega-hydroxyalkylamine of the formula $$H_2N-(CH_2)_n-OH \qquad \text{Formula VI}$$

wherein $n$ is as represented above with elimination of water to give a Schiff base of the formula

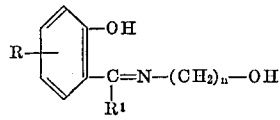

Formula VII wherein R, $R^1$ and $n$ are as represented above.

(2) The Schiff base of Formula VII is reduced as described above to give an N-(omega-hydroxyalkyl)-2-hydroxy-benzylamine of the formula

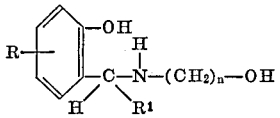

Formula VIII wherein R, $R^1$ and $n$ are as represented above.

(3) The benzylamine compound of Formula VIII is cyclized as described above using a carbonyl halide, preferably phosgene, to give a 3-(omega-hydroxyalkyl)-1,3-benzoxazine-2-one of the Formula IX

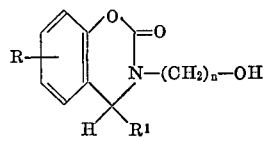

Formula IX wherein R, $R^1$ and $n$ are as represented above.

(4) A 3-(omega-hydroxyalkyl) - 1,3 - benzoxazine-2-one of Formula IX is dissolved in chloroform and the stirred chloroform solution is treated with an excess of a thionyl halide, the gaseous by-products of sulfur dioxide and hydrogen halide being swept out of the system by an inert gas, as for example, nitrogen. An equimolar amount of a secondary amine together with a tertiary amine or a metal carbonate is then added to the reaction mixture, the tertiary amine or metal carbonate binding the hydrogen halide formed during the reaction of the secondary amine with the 3 - (omega-chloro alkyl)-1,3-benzoxazine-2-one to give a product of Formula I.

The 2 - hydroxybenzaldehydes, 2-hydroxyacylphenones and 2-hydroxybenzophenones used in the present invention are commercially available or can be readily prepared by standard laboratory procedures.

The omega-amino alkylamines used in the present invention are commercially available or can be readily prepared by the phthalimide method for preparing primary alkylamines. The omega hydroxy alkylamines are likewise commercially available.

The examples below illustrate in detail some of the compounds which comprise this invention and methods for their production. However, this invention is not to be construed as limited thereby in spirit or in scope. It will be apparent to one skilled in the art that numerous modifications in materials and methods can be adopted without departing from the invention.

EXAMPLE 1

2-hydroxybenzylidine-2-morpholinoethylamine

To a 5 liter, three neck, round bottom flask equipped with stirrer, dropping funnel, condenser, and thermometer, was added a solution of 244.2 g. (2.0 mole) of salicylaldehyde in 2 liters of toluene. A trace quantity of p-toluene sulfonic acid was added. With stirring at 25° C., a solution of 260.4 g. (2.0 mole) of 4-(β-aminoethyl)-morpholine in 1 liter of toluene was added dropwise. The reaction color becomes bright yellow; it was stirred for 1 hour at 25° C., low heat applied and the toluene water azeotrope was removed under water pump vacuum. The remaining toluene was taken off by a rotary steam evaporator under reduced pressure. Upon cooling the viscous concentrate, crystals formed which were recrystallized from ligroin to yield 432 g. (98.2%) of yellow needle-like crystals melting 44.5 to 45° C. Infrared shows characteristic Schiff base band at 6.15 (1625 cm.$^{-1}$).

*Analysis.*—Calculated for $C_{13}H_{18}N_2O_2$ (percent): C, 66.64; H, 7.74; N, 11.96. Found (percent): C, 66.79; H, 7.19; N, 12.21.

EXAMPLE 2

4-chloro-2-hydroxybenzylidene-2-morpholinoethylamine

To a solution of 100 g. (0.64 mole) of 5-chlorosalicylaldehyde in 300 ml. toluene was added, dropwise with stirring at 80° C., a solution of 83.2 g. (0.64 mole) of 4-(β-aminoethyl)-morpholine. After the addition the temperature was raised to azeotrope off the water formed by the reaction. The reaction mixture was cooled, treated with activated charcoal, and filtered. Evaporation of solvent gave a yellow crystalline product which melted 62–63° C. after recrystallization from isooctane. The yield was approximately 90%.

*Analysis.*—Calculated for $C_{13}H_{17}ClN_2O_2$ (percent): C, 58.10; H, 6.38; N, 10.42; Cl, 13.19. Found (percent): C, 57.84; H, 6.41; N, 10.24; Cl, 13.22.

EXAMPLE 3

2-hydroxybenzylidene-2-(2-pyridyl)-ethylamine

To a stirring solution of 99 g. (0.812 mole) of salicylaldehyde and 500 ml. of toluene was added dropwise 100 g. (0.819 mole) of 2-(2-aminoethyl)-pyridine; the reaction was exothermic. After a three hour reflux period during which period the theoretical amount of water was removed using a Dean-Stark trap, the toluene was removed using a rotary evaporator under reduced pressure to yield a quantitative amount of the Schiff base as a viscous amber-colored oil.

EXAMPLE 4

2-hydroxy-5-methyl-α-methylbenzylidene-2-morpholinoethylamine

A stirred toluene solution containing 150.17 g. (1.0 mole) of 2-hydroxy-5-methyl acetophenone was treated dropwise with 130.19 g. (1.0 mole) of 4-(2-aminoethyl)-morpholine. The water formed by refluxing the reaction mixture was removed by azeotropic distillation using a Dean-Stark trap. The toluene was removed under reduced pressure and treatment of the residue with petroleum ether deposited crystalline solid which melted at 83–84° C.; the yield was 250 g. (95.3%).

EXAMPLE 5

2-hydroxy-3-methoxybenzylidine-2-morpholinoethylamine

A toluene solution containing 77.1 (0.59 mole) of 4-(2-aminoethyl)-morpholine was added dropwise to a stirred toluene solution containing 90.1 g. (0.59 mole) of 3-methoxy salicylaldehyde. The reaction mixture was brought to reflux and the water formed during the reaction was separated using a Dean-Stark trap. After removing the toluene the residual viscous oil solidified to yellow crystals when triturated with ligroin.

EXAMPLE 6

2-hydroxybenzylidene-3-(4-phenyl-1,2,5,6-tetrahydropyridino)-propylamine

A toluene solution of 0.15 mole of 1-(3-aminopropyl)-4-phenyl-1,2,5,6-tetrahydropyridine was added dropwise to a stirred toluene solution of 0.15 mole of salicylaldehyde. The stirred reaction mixture was refluxed until the theoretical amount of water was collected in a Dean-Stark trap. Evaporation of the toluene under reduced pressure furnished a quantitative yield of the Schiff base.

EXAMPLE 7

2-hydroxybenzylidene-3-(4-phenyl-piperazino)-propylamine

The reaction of 0.26 mole of salicylaldehyde and 0.26 mole of 1-(3-aminopropyl)-4-phenylpiperazine as described in Example 6 furnished a quantitative yield of the Schiff base.

EXAMPLE 8

When equivalent quantities of the appropriate starting materials are substituted in the above procedures the following compounds are obtained:

2-hydroxybenzylidene-2-diethylaminoethylamine,
2-hydroxybenzylidene-2-diphenylaminoethylamine,
2-hydroxybenzylidene-2-(N-methylanilino)-ethylamine,
2-hydroxybenzylidene-2-(di-p-tolylamino)-ethylamine,
2-hydroxy-α-(p-trifluoromethylphenyl)-benzylidene-2-(4-methylpiperazino)-ethylamine,
2-hydroxy-5-trifluoromethylbenzylidene-2-morpholino ethylamine,
2-hydroxy-α-phenylbenzylidene-2-(4-hydroxy-4-phenylpiperidino)-ethylamine,
5-bromo-2-hydroxybenzylidene-2-diethylaminoethylamine,
2-hydroxybenzylidene-2-pyrrolidinylethylamine,
2-hydroxy-α(4-chlorophenyl)-benzylidene-2-(N-methylanilino)-ethylamine,
2-hydroxy-α-(4-tolyl)-benzylidene-2-morpholino-ethylamine,
5-bromo-2-hydroxybenzylidene-3-(4-phenyl-1,2,5,6-tetrahydropyridino)-propylamine,
2-hydroxy-α-(4-ethylphenyl)-benzylidene-4-diethyl-aminobutylamine,
2-hydroxy-α-(4-ethoxyphenyl)-benzylidene-2-(4-phenyl-4-propionyloxy)-ethylamine,
2-hydroxybenzylidene-3-[4-(3-trifluoromethylphenyl)-1,2,5,6-tetrahydropyridino]-propylamine, and
2-hydroxybenzylidene-3-[4-(4-fluorophenyl)-1,2,5,6-tetrahydropyridino]-propylamine.

EXAMPLE 9

N-(2-morpholinoethyl)-2-hydroxybenzylamine hydrochloride (A) Catalytic reduction.—A solution of 50 g. (0.213 mole) of 2-hydroxybenzylidene-2-morpholinoethylamine in 150 ml. of absolute ethanol containing Raney nickel catalyst was shaken at the Paar apparatus at an initial pressure of 50 p.s.i. of hydrogen and at room temperature. The theoretical amount of hydrogen was adsorbed in twenty minutes. After filtration to remove the catalyst, the clear filtrate was concentrated to an oil which weighed 50 g. (100% yield).

(B) Metal hydride reduction.—To a stirred solution of 87 g. (0.37 mole) of 2-hydroxybenzylidene-2-morpholinoethylamine in 1500 ml. of absolute ethanol was added portionwise 37.8 g. (1.0 mole) of sodium borohydride. The reaction was exothermic with the pot temperature rising from room temperature to 60° C. Following addition the reaction mixture was refluxed 15 minutes, cooled and treated with 250 ml. of cold water. The solution was decanted from solids, concentrated to an oil and the oil partitioned between 6 N hydrochloric acid and ether. The aqueous acid layer was basified and the base insoluble oil extracted with ether. Concentration of the ether extracts gave 80 g. (91.9%) of product as an amber colored oil.

EXAMPLE 10

N-(2-morpholinoethyl)-5-chloro-2-hydroxybenzylamine dihydrochloride

To 50.0 g. (0.19 mole) of 5-chloro-2-hydroxybenzylidene-2-morpholinoethylamine was added 250 ml. absolute ethanol and Raney nickel catalyst. The reactants were shaken with hydrogen under 40 p.s.i. pressure until reduction appeared complete. The solution was filtered and the filtrate evaporated to yield 50.7 g. (100%) of viscous oil. A sample was converted to the dihydrochloride salt with ethereal HCl and crystallized from the isopropanol solution. The salt was recrystallized from isopropanol-isopropyl ether to give a white crystalline powder melting at 217–219° C.

*Analysis.*—Calculated for $C_{13}H_{21}Cl_3N_2O_2$ (percent): C, 45.43; H, 6.16; N, 8.15; Cl, 30.95. Found (percent): C, 45.58; H, 6.48; N, 8.12; Cl, 30.75.

EXAMPLE 11

N-[2-(2-pyridyl)-ethyl]-2-hydroxybenzylamine dihydrochloride

To a solution of 100 g. (0.44 mole) of the Schiff base 2-hydroxybenzyliden e-2-(2-pyridyl)-ethylamine in 200 ml. of absolute ethanol was added 2 small scoops of Raney nickel catalyst and the compound reduced with hydrogen in a Paar apparatus. The reduction consumed 0.42 mole hydrogen. Filtered and evaporated filtrate under reduced pressure leaving the free base as an oil. Essentially a theoretical yield was obtained. A portion of the free base was converted to the dihydrochloride salt by solution in isopropanol and treatment with ethereal HCl. White crystals were obtained which were recrystallized from methanol and methyl isobutyl ketone combination and vacuum dried; M.P. 207–208° C. (15.3 g)

*Analysis.*—Calculated for $C_{14}H_{28}Cl_2N_2O$ (percent): C, 55.82; H, 6.02; N, 9.30; Cl, 23.54. Found (percent): C, 55.61; H, 6.19; N, 9.41; Cl, 23.34.

EXAMPLE 12

N-(2-morpholinoethyl)-2-hydroxy-5-methyl-α-methylbenzylamine fumarate

Reduction of 100 g. of 2-hydroxy-5-methyl-α-methylbenzylidene - 2 - morpholinoethylamine with $NaBH_4$ in absolute ethanol gave 88.3 g. of a semi-viscous amber oil representing 88% yield. The free base was converted to the fumarate salt which was recrystallized from absolute ethanol/isopropyl ether to a constant M.P. of 155–156° C.

*Analysis.*—Calculated for $C_{19}H_{28}N_2O_6$ (percent): C, 59.98; H, 7.42; N, 7.36. Found (percent): C, 59.92; H, 7.32; N, 7.39.

EXAMPLE 13

N-(2-morpholinoethyl)-2-hydroxy-3-methoxy-benzylamine dihydrochloride

The corresponding Schiff base 2 - hydroxy-3-methoxy-benzylidene - 2 - morpholinoethylamine was dissolved in absolute ethanol (2 liters ethanol per mol of Schiff base) and sodium borohydride was added portionwise until a 2:1 molar ratio of $NaBH_4$:Schiff base had been added. Stirred for 1 hour at room temperature, heated to a gentle reflux for 15 minutes, then cooled to room temperature. The reaction flask was immersed in an ice bath and ice water added to the reaction to destroy excess borohydride. The decanted clear solution was evaporated under reduced pressure, taken up in cold 6 N HCl, diluted with cold water, extracted with ether, then made basic with small increments of concentrated $NH_4OH$ in the cold. The free base was extracted into ether which upon evaporation gives generally yields of about 80%. A sample of the reduced product was converted to the dihydrochloride salt in anhydrous isopropanol and subsequent recrystallization from anhydrous isopropanol gave white crystals, M.P. 208–210° C.

*Analysis.*—Calculated for $C_{14}H_{22}N_2O_3 \cdot 2HCl$ (percent): C, 49.56; H, 7.13; N, 8.26; Cl, 20.90. Found (percent): C, 49.63; H, 6.99; N, 8.32; Cl, 20.86.

EXAMPLE 14

N-[3-(4-phenyl-1,2,5,6-tetrahydropyridino)-propyl]-2-hydroxybenzylamine dihydrochloride To a stirred solution of 163.0 g. (0.5 mole) of 2-hydroxybenzylidene - 3 - (4-phenyl - 1,2,5,6 - tetrahydropyridino)-propylamine in 900 ml. of absolute methanol was added slowly a solution of 37.8 g. (1.0 mole) of sodium borohydride in 700 ml. of methanol. After the addition was complete the solution was refluxed for 15 minutes, cooled and treated with 1500 ml. of cold water. The oil which separated was extracted with benzene and the extracts washed with water. The oil which remained after the solvent was evaporated weighed 159 g. A portion (18.0 g.) of the free base was dissolved in 200 ml. of isopropanol and treated with ethereal hydrogen chloride. The white crystalline salt which formed weighed 18.1 g. (79% yield and melted at 224–226° C. The analytical sample softened at 221° and melted at 224.5–226.5° after it was recrystallized from an isopropanol-ethanol mixture.

*Analysis.*—Calculated for $C_{21}H_{28}N_2OCl_2$ (percent): C, 63.79; H, 7.14; N, 7.09. Found (percent): C, 63.87; H, 7.26; N, 7.04.

EXAMPLE 15

N-[3-(4-phenylpiperazino)-propyl]-2-hydroxybenzylamine

The reduction of the crude schiff base of Example 6 was run as described in Example 14 to give a quantitative yield of N-[3 - (4 - phenylpiperazino) - propyl] - 2 - hydroxybenzylamine.

EXAMPLE 16

When equivalent quantities of the appropriate starting materials are substituted in the above procedures, the following compounds are obtained:

N-(2-diethylaminoethyl)-2-hydroxybenzylamine,
N-(2-diphenylaminoethyl)-2-hydroxybenzylamine,
N-[2-(N-methylanilino)-ethyl]-2-hydroxybenzylamine,
N-[2-(di-p-tolylamino)-ethyl]-2-hydroxybenzylamine,
N-(4-methylpiperazinoethyl)-2-hydroxy-α-(p-trifluoromethylphenyl)-benzylamine,
N-(2-morpholinoethyl)-2-hydroxy-5-trifluoromethylbenzylamine,
N-(4-hydroxy-4-phenylpiperidinoethyl)-2-hydroxy-α-phenylbenzylamine,
N-(2-diethylaminoethyl)-5-bromo-2-hydroxy-benzylamine,
N-[2-(N-methylanilino)-ethyl]-α-(4-chlorophenyl)-2-hydroxybenzylamine,
N - (2 - morpholinoethyl) - 2 - hydroxy - α - (p - tolyl)-benzylamine,
N - [3 - (4 - phenyl - 1,2,5,6 - tetrahydropyridino)-propyl]-5-bromo-2-hydroxybenzylamine,
N - (4 - diethylaminobutyl) - α - (4 - ethylphenyl - 2-hydroxybenzylamine,
N - (4 - phenyl - 4 - propionyloxy) - α - (4 - ethoxyphenyl) -2-hydroxybenzylamine,
N - {3 - [4 - (3 - trifluoromethyl) - phenyl] - 1,2,5,6-tetrahydropyridinopropyl}-2-hydroxybenzylamine, and
N - {3 - [4 - (4 - fluoro) - phenyl] - 1,2,5,6 - tetrahydropyridinopropyl}-2-hydroxybenzylamine.

EXAMPLE 17

3-(2-morpholinoethyl)-1,3-benzoxazine-2-one hydrochloride

To a solution of 21.0 g. (0.089 mole) of N-(2-morpholinoethyl)-2-hydroxybenzylamine in 200 ml. of chloroform at 0° C. was added dropwise with stirring a solution of 8.90 g. (0.089 mole) of phosgene in 100 ml. of cold chloroform. Stirring was continued for 0.5 hour until the temperature was 10° C., then a solution of 7.30 g. (0.18 mole) of NaOH in dioxane/ethanol solvent was added dropwise at 10° C. Allowed to come to room temperature and stirred for one hour. The solvents were removed by using a rotary evaporator under reduced pressure leaving a solid which was recrystallized from aqueous ethanol and air dried. Yield 17.4 g. (74.5%). The compound was recrystallized from aqueous isopropanol and vacuum dried to a final, constant M.P. 121–122° C.

*Analysis.*—Calculated for $C_{14}H_{18}N_2O_3$ (percent): C, 64.10; H, 6.92; N, 10.68. Found (percent): C, 64.29; H, 7.03; N, 10.62.

The free base was converted to the hydrochloride salt by solution in isopropanol/isopropyl ether and addition of ethereal-HCl. White crystals, M.P. 254–255° C. Volhard analysis for percent Cl⁻.—Calculated for $C_{14}H_{18}N_2O_3 \cdot HCl$ (percent): Cl⁻, 11.87. Found (percent): Cl⁻, 11.55.

EXAMPLE 18

6-chloro-3-(2-morpholinoethyl)-1,3-benzoxazine-2-one

To a 1 liter, 3 neck, R.B. flask equipped with stirrer, thermometer, dropping funnel and condenser, was added a solution of 50.7 g. (0.187 mole) of N-(2-morpholinoethyl)-5-chloro-2-hydroxybenzylamine in 500 ml. of $CHCl_3$. After cooling to 0° C., a solution of 0.188 mole of phosgene in 150 ml. $CHCl_3$ was added dropwise. Stirred for 1 hour then added powdered anhydrous sodium carbonate (20.14 g., 0.19 mole) together with about 50 ml. of ethanol. Stirred for ½ hour, then warmed to reflux and stirred at gentle reflux for 1 hour; the solution goes from a clear suspension to an opaque suspension with moderate evolution of $CO_2$ gas. After ½ hour most of the $CO_2$ had been evolved but continued to heat at reflux for an additional hour. Cooled to room temperature, added water, adjusted to acid pH with dilute HCl and separated the aqueous layer. The $CHCl_3$ layer was washed with water and the combined water extracts were carefully adjusted to pH 10 to 10.5 using 3 N NaOH and a portable pH meter. The free base precipitated from solution and was recrystallized from boiling water as white platelets which were vacuum dried. M.P. 136.5–137.0° C. Yield 10.0 grams of pure free base.

Potentiometric titration with $HClO_4$ in glacial acetic acid solvent gave following results: Mol. wt. 294.64 (calcd. 296.76).

*Analysis.*—Calculated for $C_{14}H_{17}ClN_2O_3$ (percent): C, 56.66; H, 5.77; N, 9.44; Cl, 11.95. Found (percent): C, 56.76; H, 5.87; N, 9.48; Cl, 12.02.

EXAMPLE 19

3-[2-(2-pyridyl)-ethyl]-1,3-benzoxazine-2-one hydrochloride

To a toluene solution of 69.5 g. (0.3 mole) of N-[2-(2-pyridyl)-ethyl]-2-hydroxybenzylamine was added portionwise with shaking, 16.45 g. (0.3 mole) of sodium methoxide. Warmed for ½ hour then stripped off the solvent under reduced pressure, treated with more dry toluene, and evaporated off solvents again under reduced pressure. Redissolved in toluene and treated in the cold, 0° C., with a solution of 11.13 g. (0.3 mole) of phosgene in toluene. A dark semi-solid was obtained on evaporation of solvent. The material was dissolved in methanol, treated with ethereal HCl and precipitated with isopropyl ether. Recrystallized twice from methanol/isopropyl ether to a constant M.P. of 169–170° C.

*Analysis.*—Calculated for $C_{15}H_{15}ClN_2O_2$ (percent): C, 61.96; H, 5.54; N, 9.64; Cl, 12.19. Found (percent): C, 61.90; H, 5.43; N, 9.70; Cl, 12.21.

EXAMPLE 20

4,6-dimethyl-3-(2-morpholinoethyl)-1,3-benzoxazine-2-one fumarate

To a solution of 37.6 g. (0.38 M) of phosgene in $CHCl_3$ at −10° C. was added dropwise to a solution of 100 g. (0.38 M) N-(2-morpholinoethyl)-2-hydroxy-5-methyl-α-methylbenzylamine in $CHCl_3$; the temperature was kept below 0° C. during the addition. Warmed slowly to reflux, then cooled again to 0° C. and added 41.06 g. (0.76 M) of sodium methoxide in cold isopropanol to pH 8.0. Warmed to gentle reflux and refluxed with stirring for 6 hours. Cooled, filtered, and evaporated filtrate to yield 106 g. of a semi-viscous oil which was about 60% product according to thin layer chromatography. The fumarate salt was made using 50 grams of the free base and was recrystallized repeatedly from absolute ethanol to a constant M.P. of 178–179° C.

*Analysis.*—Calculated for $C_{20}H_{26}N_2O_7$ (percent): C, 59.10; H, 6.45; N, 6.89. Found (percent): C, 59.32; H, 6.37; N, 6.88.

EXAMPLE 21

8-methoxy-3-(2-morpholinoethyl)-1,3,benzoxazine-2-one

To a chloroform solution of 32.05 g. (0.327 mole) of phosgene at −10° C., was added dropwise at a moderate rate a chloroform solution of 87.1 g. (0.327 mole) of N-(2-morpholinoethyl)-2-hydroxy-3-methoxybenzylamine maintaining a temperature at −10° C. with an acetone/Dry Ice bath. Slowly warmed to room temperature, then refluxed for 1 hour. Cooled to 0° C. with salt/ice bath and added 35.34 (0.654 mole) of powdered $NaOCH_3$ portionwise slowly, followed by 200 ml. of isopropanol. Allowed to stir 1 hour then heated to gentle reflux for 6 hours. Filtered and evaporated solvents to leave a solid which was recrystallized from boiling isopropanol. The white crystalline free base (48.6 g., 51%) melted at 127–128° C.

*Analysis.*—Calculated for $C_{15}H_{20}N_2O_4$ (percent): C, 61.63; H, 6.90; N, 9.58. Found (percent): C, 61.54; H, 6.93; N, 9.70.

EXAMPLE 22

3-[3-(4-phenyl-1,2,5,6-tetrahydropyridino)-propyl]-1,3-benzoxazine-2-one hydrochloride To a 2 liter, three necked, round bottom flask equipped with stirrer, condenser, dropping funnel, and low range thermometer, was added a solution of 41 g. (0.127 mole) of N-[3-(4-phenyl-1,2,5,6-tetrahydropyridino)propyl]-2-hydroxy-benzylamine dissolved in 500 ml. of chloroform and cooled with stirring to a temperature below −10° C. with Dry Ice/acetone bath. While maintaining the temperature below −10° C., a chloroform solution containing 12.5 g. (0.127 mole) of phosgene was added dropwise. Warmed slowly to room temperature and stirred for 2 hours. The reaction was cooled to −10° C. again and a solution of 14.25 g. (0.254 mole) of KOH (saturated solution) was added dropwise, warmed to room temperature, then allowed to stir at a gentle reflux overnight. The reaction mixture was cooled, filtered, made acidic with aqueous HCl, and the solvent removed by evaporation under reduced pressure. The concentrate was dissolved again in water, made basic with $NH_4OH$, and extracted with ether. The ether extracts were combined, washed with water, and dried over $Na_2SO_4$. The hydrochloride salt was made directly from the filtered ether extract by addition of ethereal HCl and crystallized as white crystals when rubbed with a small amount of acetone. The crystalline salt was recrystallized from absolute ethanol and vacuum dried; M.P. 232–233° C.

*Analysis.*—Calc'd for $C_{22}H_{24}N_2O_2 \cdot HCl$ (percent): C, 68.65; H, 6.55; N, 7.28; Cl, 9.21. Found (percent): C, 68.64; H, 6.67; N, 7.24; Cl, 9.43.

EXAMPLE 23

3-[3-(4-phenylpiperazino)-propyl]-1,3-benzoxazine-2-one hydrochloride

To a chloroform solution of 22.4 g. (0.07 mole) N-[3-(4-phenylpiperazino)-propyl]-2-hydroxybenzylamine at −10° C. was added slowly a chloroform solution containing 6.76 g. (0.07 mole) phosgene. Allowed reaction to slowly warm to room temperature then refluxed with stirring for 10 minutes. Cooled to −10° C. and added 7.46 g. (0.14 mole) of powdered $NaOCH_3$ portionwise with small amounts of isopropanol. Warmed to reflux and refluxed with stirring 1 hour, cooled, filtered, and evaporated filtrate to yield a white crystalline solid which was the monohydrochloride. Recrystallization of the monohydrochloride from ethanol gave white platelets which melted above 250° C. Yield: 10 grams.

*Analysis.*—Calc'd for $C_{21}H_{26}ClN_3O_2$ (percent): C, 65.02; H, 6.76; N, 10.83. Found (percent): C, 65.07; H, 7.04; N, 10.84.

EXAMPLE 24

When equivalent quantities of the appropriate starting materials are substituted in the above procedures, the following compounds are obtained:

3-(2-diethylaminoethyl)-1,3-benzoxazine-2-one,
3-(2-diphenylaminoethyl)-1,3-benzoxazine-2-one,
3-[2-(N-methylanilino)-ethyl]-1,3-benzoxazine-2-one,
3-[2-(di-p-tolylamino)-ethyl]-1,3-benzoxazine-2-one,
3-(4-methylpiperazinoethyl)-4-(p-trifluoromethylphenyl)-1,3-benzoxazine-2-one,
3-(2-morpholinoethyl)-6-trifluoromethyl-1,3-benzoxazine-2-one,
3-(4-hydroxy-4-phenylpiperidinoethyl)-4-phenyl-1,3-benzoxazine-2-one,
6-bromo-3-(2-diethylaminoethyl)-1,3-benzoxazine-2-one,
3-(2-pyrrolidinylethyl)-1,3-benzoxazine-2-one,
4-(4-chlorophenyl)-3-[2-(N-methylanilino)-ethyl]-1,3-benzoxazine-2-one,
4-(p-tolyl)-3-(2-morpholinoethyl)-1,3-benzoxazine-2-one,
6-bromo-3-[3-(4-phenyl-1,2,5,6-tetrahydropyridino)-propyl]-1,3-benzoxazine-2-one,
3-(4-diethylaminobutyl)-4-(4-ethylphenyl)-1,3-benzoxazine-2-one,
4-(4-ethoxyphenyl)-3-(4-phenyl-4-propionyloxypiperidinoethyl)-1,3-benzoxazine-2-one,
3-[4-(3-trifluoromethylphenyl)-1,2,5,6-tetrahydropyridino]-propyl-1,3-benzoxazine-2-one, and
3-[3-(4-fluorophenyl)-1,2,5,6-tetrahydropyridino]-propyl-1,3-benzoxazine-2-one.

The high order of activity of the active agents of the present invention, as evidenced by tests in lower animals is indicative of utility. It will be clearly understood that the distribution and marketing of any compound or composition falling within the scope of the present invention for use in human beings will of course have to be predicated upon prior approval by governmental agencies, such as the Federal Food and Drug Administration, which are responsible for and authorized to pass judgment on such questions.

Formulation and administration: Effective quantities of any of the foregoing pharmacologically active compounds of Formula I may be administered to a living animal body in any one of various ways, for example, orally as in capsules or tablets, parenterally in the form of sterile solutions or suspensions, and in some cases intravenously, e.g., in the form of sterile isotonic solutions. The compounds may be administered alone or in combination with other pharmacologically effective agents, such as analgesics, sedatives, antacids, other tranquillizing agents, antiappetite or antiulcer drugs, or the like, as well as buffers and usual pharmaceutical carriers or diluents. The free basic amino compounds, while effective, are preferably formulated and administered in the form of their nontoxic acid-addition salts for purposes of convenience of crystallization, increased solubility, and the like. The compounds of Formula I, especially in the form of their acid-addition salts, represent a preferred group of highly active compounds.

Although very small quantities of the active materials of the present invention are effective when minor therapy is involved or in case of administration to subjects having a relatively low body weight, unit dosages are usually five milligrams or above and preferably twenty-five, fifty or one-hundred milligrams or even higher, depending of course upon the emergency of the situation and the particular result desired. Five to fifty milligrams appears optimum per unit dose, while usual broader ranges appear to be one to 100 milligrams per unit dose. The active agents of the invention may be combined with other pharmacologically active agents, or with buffers, antacids or the like, for administration and the proportion of the active agent in the compositions may be varied widely. It is only necessary that the active ingredient constitute an effective amount, i.e., such that a suitable effective dosage will be obtained consistent with the dosage form employed. Obviously, several unit dosage forms may be administered at about the same time. The exact individual dosages as well as daily dosages in a particular case will of course be determined according to established medical principles under the direction of a physician or veterinarian.

The formulations of the following example are representative for all of the pharmacologically active compounds of the invention.

EXAMPLE FORMULATIONS (1) Capsules

Capsules of 5 mg., 25 mg., and 50 mg. of active ingredient per capsule are prepared. With the higher amounts of active ingredient, reduction may be made in the amount of lactose.

| Typical blend for encapsulation | Per capsule, mg. |
|---|---|
| Active ingredient, as salt | 5.0 |
| Lactose | 296.7 |
| Starch | 129.0 |
| Magnesium stearate | 4.3 |
| Total | 435.0 |

Additional capsule formulations preferably contain a higher dosage of active ingredient and are as follows:

| Ingredients | 100 mg. per capsule | 250 mg. per capsule | 500 mg. per capsule |
|---|---|---|---|
| Active ingredient, as salt | 100.0 | 250.0 | 500.0 |
| Lactose | 231.5 | 126.5 | 31.1 |
| Starch | 99.2 | 54.2 | 13.4 |
| Magnesium stearate | 4.3 | 4.3 | 5.5 |
| Total | 435.0 | 435.0 | 550.0 |

In each case, uniformly blend the selected active ingredient with lactose, starch, and magnesium stearate and encapsulate the blend.

(2) Tablets

A typical formulation for a tablet containing 5.0 mg. of active ingredient per tablet follows. The formulation may be used for other strengths of active ingredient by adjustment of weight of dicalcium phosphate.

| | Per tablet, mg. |
|---|---|
| (1) Active ingredient, as salt | 5.0 |
| (2) Corn starch | 13.6 |
| (3) Corn starch (paste) | 3.2 |
| (4) Lactose | 79.2 |
| (5) Dicalcium phosphate | 68.0 |
| (6) Calcium stearate | 0.9 |
| Total | 170.1 |

Additional tablet formulations preferably contain a higher dosage of the active ingredient and are as follows:

(A) 50 mg. tablet

| Ingredients: | Per tablet, mg. |
|---|---|
| Active ingredient, as salt | 50.0 |
| Lactose | 90.0 |
| Milo starch | 20.0 |
| Corn starch | 38.0 |
| Calcium stearate | 2.0 |
| Total | 200.0 |

Uniformly blend the active ingredient, lactose, milo starch and corn starch. This blend is granulated using water as a granulating medium. The wet granules are passed through an eight mesh screen and dried at 140 to 160 degrees Fahrenheit overnight. The dried granulates are passed through a number ten mesh screen and blended with the proper amount of calcium stearate and this blend is then converted into tablets on a suitable tablet press.

(B) 100 mg. tablet

| Ingredients: | Per tablet, mg. |
|---|---|
| Active ingredient, as salt | 100.0 |
| Lactose | 190.0 |
| Dicalcium phosphate | 172.2 |
| Starch | 52.0 |
| Milo starch | 21.6 |
| Calcium stearate | 2.2 |
| Total | 540.0 |

Uniformly blend the active ingredient, lactose, dicalcium phosphate, starch and milo starch. This blend is granulated with water and the wet mass is passed through a number eight mesh screen. The wet granules are dried at 140–160 degrees Fahrenheit overnight. The dried granules are passed through a number ten mesh screen. These dried granules are blended with the proper weight of calcium stearate and the lubricated granules are then converted into tablets on a suitable tablet press.

(C) 250 mg. tablet

| Ingredients: | Per tablet, mg. |
|---|---|
| Active ingredient, as salt | 250.0 |
| Corn starch | 56.0 |
| Carbowax 6000 (polyethylene glycol of M.W. approximately 6000) | 25.0 |
| Lactose | 35.0 |
| Magnesium stearate | 4.0 |
| Total | 370.0 |

Uniformly blend the active ingredient, Carbowax 6000, lactose, and one-half the weight of magnesium stearate required. This blend is then "slugged" on a suitable tablet press. These "slugs" are granulated through a ten mesh screen on an oscillation granulator. These granules are then blended with the remainder of the magnesium stearate and the lubricated granules are then coverted into tablets on a suitable tablet press.

(D) 500 mg. tablet

| Ingredients: | Per tablet, mg. |
|---|---|
| Active ingredient, as salt | 500.0 |
| Corn starch (wet) | 86.4 |
| Milo starch | 32.4 |
| Calcium stearate | 3.2 |
| Corn starch (dry) | 26.0 |
| Total | 648.0 |

Uniformly blend the active ingredient, corn starch and milo starch. This blend is wet granulated using water and the wet mass is passed through a number eight mesh screen. These wet granules are dried overnight at 140–160 degrees Fahrenheit. The dried granules are passed through a number ten mesh screen. The dried granules and weighed amounts of corn starch and calcium stearate are uniformly blended and these lubricated granules are compressed on a suitable tablet press.

(3) Injectable—2% sterile solution

Per cc.
Active ingredient _____mg__ 20
Preservative, e.g., chlorobutanol
    percent weight/volume__ 0.5
Water for injection.

Prepare solution, clarify by filtration, fill into vials, seal, and autoclave.

(4) The pharmacologically active compounds provided by the present invention may also be administered successfully by embodying an effective quantity thereof in an injectable suspension for injection into an animal body, in oral powders, suspensions or syrups, and in other acceptable dosage forms.

Various modifications and equivalents will be apparent to one skilled in the art and may be made in the compounds, compositions, and methods of the present invention without departing from the spirit or scope thereof, and it is therefore to be understood that the invention is limited only by the scope of the appended claims.

I claim:

1. A compound selected from the group consisting of 3-(omega-aminoalkyl) - 1,3 - benzoxazine-2-ones of the formula:

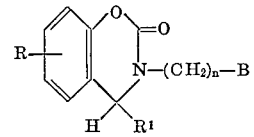

wherein:

R is selected from the group consisting of hydrogen, halogen having an atomic weight less than 80, lower alkyl, lower alkoxy and trifluoromethyl, $R^1$ is selected from the group consisting of hydrogen, lower alkyl, phenyl and monosubstituted phenyl wherein the substituents on the phenyl ring are selected from the group consisting of lower-alkyl, lower-alkoxy, trifluoromethyl and halogen, B is selected from the group consisting of di-(loweralkyl)-amino, N-(lower-alkyl)-phenylamino, diphenylamino, morpholino, pyrrolidino, 4-(lower-alkyl)-piperazino, 4-phenylpiperazino, 4-phenyl-4-hydroxy-piperidino, 4-phenyl-4-alkanoyloxypiperidino wherein alkanoyl has a maximum of three carbon atoms, 4-phenyl-1,2,5,6-tetrahydropyridino, 4-(3-trifluoromethylphenyl)-1,2,5,6-tetrahydropyridino, 4-(4-fluorophenyl)-1,2,5,6-tetrahydropyridino, and 2-pyridyl, n is an integer from 2 to 4 inclusive, and acid addition salts thereof.

2. A compound of claim 1 which is 3-(2-morpholinoethyl)-1,3-benzoxazine-2-one hydrochloride.

3. A compound of claim 1 which is 6-chloro-3-(2-morpholinoethyl)-1,3-benzoxazine-2-one.

4. A compound of claim 1 which is 8-methoxy-3-(2-morpholinoethyl)-1,3-benzoxazine-2-one.

5. A compound of claim 1 which is 3-[3-(4-phenyl-1,2,5,6-tetrahydropyridino)propyl] - 1,3 - benzoxazine-2-one hydrochloride.

6. A compound of claim 1 which is 3-[3-(4-phenylpiperazino)propyl]-1,3-benzoxazine-2-one hydrochloride.

References Cited

UNITED STATES PATENTS

| 3,013,020 | 12/1961 | Fancher | 260—570.9 |
| 3,019,262 | 1/1962 | Ambelang | 260—570.9 |
| 3,143,572 | 8/1964 | Surrey | 260—570.9 |

FOREIGN PATENTS 1,015,406   12/1965   Great Britain.

OTHER REFERENCES

Emerson I. N.: Adams Organic Reactions, vol. IV, pp. 174–77, 179, 181, 182, 199 and 215 relied on, N.Y., Wiley, 1948.

HENRY R. JILES, Primary Examiner

N. TROUSOF, Assistant Examiner

U.S. Cl. X.R.

260—244, 247.5, 268, 294.3, 294.7, 296, 326.5, 566, 570, 570.8, 570.9, 591, 592; 424—248